July 18, 1961 G. C. GAINER ET AL 2,993,082

SILOXANE TO METAL BONDED INSULATION

Filed Jan. 22, 1957

WITNESSES:

Bernard R. Gieguey

Wm. B. Sellers

INVENTORS
Gordon C. Gainer and
Edward J. Croop.
BY
William G. Addison
ATTORNEY 2,993,082
Patented July 18, 1961

2,993,082

SILOXANE TO METAL BONDED INSULATION

Gordon C. Gainer, Penn Township, Allegheny County, and Edward J. Croop, Pittsburgh, Pa., assignors to Westinghouse Electric Corporation, East Pittsburgh, Pa., a corporation of Pennsylvania Filed Jan. 22, 1957, Ser. No. 635,402
4 Claims. (Cl. 174—52)

The present invention relates to electrical apparatus and has particular reference to sealing electrical apparatus against the entrance of moisture, dirt and other foreign matter.

Heretofore, electrical apparatus has been encapsulated, potted or cast in synthetic resinous compositions of various kinds to provide insulation for such apparatus. All such apparatus carries electrically conducting leads and/or mounting hardware which extends from the interior of the apparatus to the exterior of the insulating coating. It has been determined that moisture, dirt and other foreign matter penetrates into the electrical apparatus along such leads or pieces of mounting hardware.

Silicone rubber is particularly suitable for use in insulating electrical apparatus because it is extremely stable thermally and exhibits satisfactory elastomeric or stress relieving characteristics at temperatures as low as −65° F. It has been determined, however, that an adherent bond between metal components and silicone rubber is difficult to achieve. Thus, to achieve such a bond the silicone rubber must be cured against the metal under pressure and at a temperature of about 125° C. for a period of about one hour. The pressed silicone rubber-metal joint then must be fully postcured for 24 hours at 250° C. to attain optimum bonding.

Because of these requirements, it is difficult to achieve a moisture-proof bond between silicone rubber and the metal portions of electrical components such as resistors, coils, magnetic amplifier coils, transformers, condensers and the like. This arises because exposure of such electrical components to extended heating periods and high pressure causes such components either to break, shatter, or undergo substantial undesirable changes in electrical characteristics. Furthermore, certain types of electronic equipment, such as magnetic amplifiers, cannot be press cured under any considerable pressure since permanent distortion of the magnetic amplifier core usually results.

The object of the present invention is to provide siloxane to metal bonded sealing means to prevent the entrance of moisture, dirt and other foreign matter along the conductor leads or other projections into the interior of insulated electrical apparatus.

Another object of this invention is to provide silicone rubber bonded metal foil members of predetermined shape adapted for mounting upon leads and mounting hardware carried by electrical apparatus.

Still another object of the present invention is to provide preformed sealing elements formed of a layer of metal having a layer of fully cured organopolysiloxane elastomer bonded thereto.

Other and further objects of the present invention will in part be obvious and will in part appear hereinafter.

For a more complete understanding of the present invention, reference is made to the following description taken in conjunction with the accompanying drawing, in which:

FIGURE 1 thereof is a side view, partly in section, illustrating a transformer carrying electrically conducting leads and mounting hardware provided with preformed sealing elements of this invention;

Figure 1:
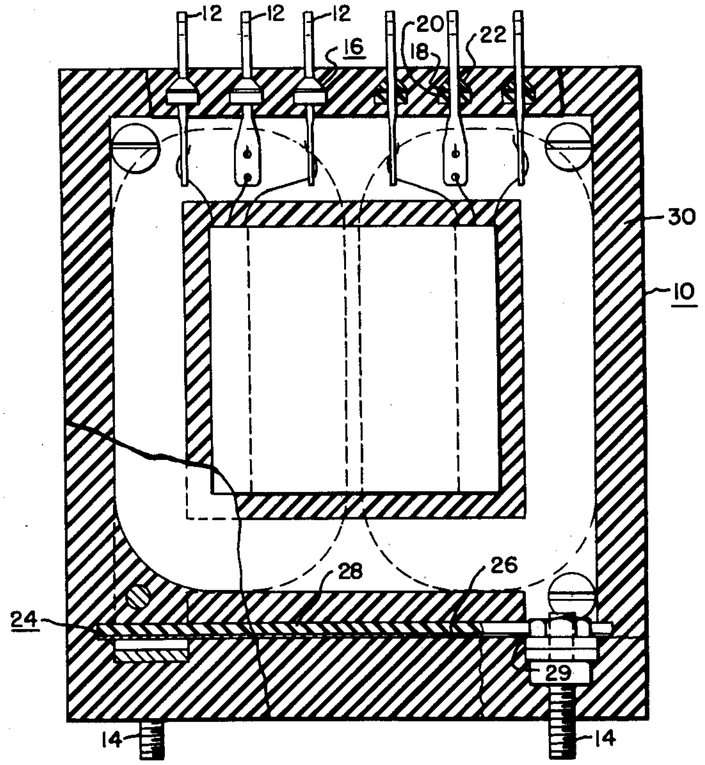

In accordance with the present invention, and in the attainment of the foregoing objects, moistureproof seals are provided about all of the leads and mounting hardware carried by electrical apparatus and passing through an insulating coating surrounding such apparatus.

More specifically, such seals are provided by mounting preformed sealing elements about the leads and metallic mounting members. Broadly, such sealing elements comprise members of predetermined shape composed of a layer of metal having a layer of fully cured organopolysiloxane elastomer bonded thereto.

In preparing such preformed sealing elements, a sheet of organopolysiloxane has a layer or thin sheet of metal in a thickness of from 1 to 10 mils bonded thereto. The surface of the metal sheet to which bonding of the silicone rubber is desired first is primed with a suitable silicone rubber primer such as, for example, ethyl orthosilicate, phenylmethylpolysiloxane, or the like. Such primer coating may be applied to the surface of the metal sheet by brushing, spraying, roller coating or the like. Such coating may be allowed to dry and harden in air or it may be baked in a suitable oven.

The silicone rubber which is bonded to the primed surface of the metal foil comprises organopolysiloxane compounds containing silicon atoms connected to each other by oxygen atoms through silicon-oxygen linkages, the siloxanes having an R to Si ratio of from 1.98 to 2.25. Such compounds have the following recurring group:

$$\begin{array}{c} R \\ | \\ -\mathrm{Si}-\mathrm{O}- \\ | \\ R \end{array}$$

wherein R represents monovalent organic radicals selected from the group consisting of alkyl radicals having not more than four carbon atoms and phenyl, tolyl, and xylyl radicals, at least 50% being alkyl groups. These liquid compositions may include some cyclic silicones.

We have secured good results with silicones in which the majority, if not all, of the monovalent organic radicals are methyl radicals. A gum having a minor proportion of phenyl radicals, preferably present as phenylmethyl silicon-oxide groups $$\begin{array}{c} C_6H_5 \\ | \\ -\mathrm{Si}-\mathrm{O}- \\ | \\ CH_3 \end{array}$$

or diphenyl silicon-oxide groups $$\begin{array}{c} C_6H_5 \\ | \\ -\mathrm{Si}-\mathrm{O}- \\ | \\ C_6H_5 \end{array}$$

gives good results. Similar results also are obtained when tolyl or xylyl radicals are substituted for the phenyl radicals.

The siloxane elastomer may be prepared by hydrolyzing a dialkyl silane or a mixture of a dialkyl and a diphenyl silane, the silanes containing an everage of approximately two readily hydrolyzable groups per silicon atom. Typical readily hydrolyzable groups are halogens, for example, chlorine or fluorine, and alkoxides, for example, methoxy and ethoxy, and amino groups. While it is preferred that the alkyl groups attached to silicon be entirely methyl, because of the outstanding qualities of dimethyl siloxane elastomers, other monovalent hydrocarbon groups, such as ethyl, propyl, and the like, may be present.

Upon hydrolysis of the dialkyl silane or mixed dialkyl silane and diaryl silane, there result oily silicone type polymers in which a majority of the units comprise the recurring structure $$-\overset{\displaystyle R}{\underset{\displaystyle R}{\overset{|}{\underset{|}{Si}}}}-O$$

These oily siloxane polymers, for example, a dimethyl silicone oil, may be treated with various agents to convert them to high viscosity liquid silicones. Suitable examples of such agents include ferric chloride, concentrated sulfuric acid, sulfuryl chloride, sulfuryl bromide, sulfuryl fluoride, phenyl phosphoryl dichloride, and alkoxy phosphoryl dihalides. The high viscosity liquids also may be produced in other known ways, as by treating the oils with an acyl peroxide.

It is desirable to add finely divided fillers to the silicone oils or to the high viscosity liquid silicones before converting the same to elastomers to increase their thixotropic properties as well as improve their tensile strength and other physical properties. Heat resistant inorganic compounds are preferred for this purpose. Examples thereof include asbestos, clay, barium titanate, iron oxide, bentonite, zinc oxide, lithopone, titania, magnesia, graphite, slate, mica diatomaceous earth, calcium carbonate, lead oxide, alumina, and calcium silicate.

Acyl peroxides suitable for converting the siloxane oils, gums or gels to elastomers contain at least one aromatic acyl radical. Examples of such peroxides are benzoyl peroxide, benzoyl acetyl peroxide, dinaphthoyl peroxide, and benzoyl lauryl peroxide. The acyl radical in such peroxides may contain an inorganic substituent such, for example, as a halogen or a nitro group. The amount of acyl peroxide employed to convert a silicone liquid to an elastomer ordinarily need not exceed 10% of the weight of the silicone with 2% to 4% generally being sufficient. If the liquid siloxane is of such a high viscosity as to render its application to members by dipping techniques difficult, it may be thinned to the desired viscosity by the addition of an organic solvent such as toluene, hexane, or the like.

The amount of the organic filler to be incorporated in the liquid siloxane may be varied over a wide range of proportions. As little as 25 parts of the inorganic filler per hundred parts of the liquid silicone will produce good results. Ordinarily, however, the amount of the finely divided filler will vary from 100 parts to 200 parts and more for each 100 parts of the liquid siloxane.

The superimposed layers of metail foil and silicone rubber are placed in a suitable press and cured under pressure of about 50 to 1000 p.s.i. for a period of about 5 to 60 minutes at a temperature of about 100° C. to 150° C. and preferably about 125° C. The partially cured laminated structure then is fully postcured for 24 hours at 250° C. to attain optimum bonding of the metal to the silicone rubber.

Sealing members of a predetermined design, for example, in the shape of washers which may be round, square, rectangular or any other desired shape, then are punched from the sheet of silicone rubberized metal foil. An opening is punched in the center of the washer of a size and shape such as to permit insertion therethrough of a lead or mounting member of a suitable design. When mounting the sealing element on the lead or hardware member, it is essential that the silicone rubber surface of the sealing member face toward the electrical component. The metal face of the washer then is on the outside of the component with the lead or hardware mounting member projecting through the form-fitting hole in the washer sealing element. The metal face of the rubberized metal sealing element then is soldered completely to the circumferential faces, sides, or edges of the conductor lead or mounting bolt. This may be done by use of a soldering iron, in the usual manner, or preferably by dipping the fluxed lead conductor or mounting bolt and washer sealing element in a soldering pot. Previous tinning of the metal face of the sealing element facilitates the soldering operation.

The electrical apparatus with the sealing element soldered to the conductor lead or mounting bolt thereof then is completely encapsulated in a quantity of uncured silicone rubber of a composition similar to that used in preparing the sealing element. The encapsulating silicone rubber will, upon heating, cure to a thermoset elastomer and bond to the previously fully cured silicone rubber portion of the sealing element. Intrusion of moisture, water vapor, or other foreign matter from the outside environment into the interior of the electrical apparatus is prevented by the complete solder seal between the lead conductor or mounting bolt and the metal surface of the sealing element. A second seal beyond this location is provided by the chemical bond between the silicone rubber portion of the sealing member and the encapsulating layer of silicone rubber.

FIG. 1 of the drawing illustrates a transformer 10 having leads 12 and mounting hardware, such as bolts 14, provided with elements or members adapted to prevent the intrusion of moisture into the interior of the transformer. As illustrated in the drawing, each of the leads 12 has a sealing element 16 mounted thereon. Element 16 comprises a layer of metail foil 18 bonded to a layer of fully cured organopolysiloxane elastomer 20. The metal face of element 16 is soldered completely as indicated at 22 to metal conductor 12.

Mounting bolt assembly 14 also is provided with a sealing element referred to generally by reference numeral 24. Sealing element 24 comprises a layer of metal foil 26 bonded to a layer of fully cured organopolysiloxane resin 28. Metal foil 26 is soldered to bolt assembly 14 as indicated at 29.

The entire transformer is encapsulated within a layer of organopolysiloxane resin 30. The encapsulating layer of organopolysiloxane resin, when fully cured, bonds chemically with the layer of previously fully cured organopolysiloxane 20 and 28 of sealing elements 16 and 24.

The solder joint 22 bonding metal foil 18 to lead 12 and joint 29 bonding metal 26 to bolt 14 provide metal to metal seals preventing the passage of moisture, dirt or other foreign matter along the leads and bolts. The chemical bond between the encapsulating layer 30 of silicone rubber and the layers 20 and 28 of elements 16 and 24 provides a further assurance against the entrance of moisture into the interior of transformer 10.

Figure 3:
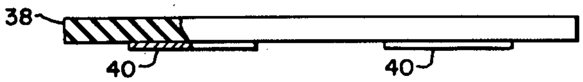
FIG. 3 is a side view, partly in section, illustrating a preformed element in accordance with this invention comprising metallic foil bonded to a layer of substantially fully cured organopolysiloxane elastomer.
Figure 4:
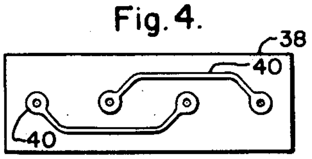
FIG. 4 is a view illustrating a portion of a printed circuit prepared in accordance with this invention.

It is a further feature of the present invention that printed circuits may be prepared utilizing the concept of bonding metal foil to sheets of silicone rubber. The preparation of such a printed circuit sheet is illustrated diagrammatically in FIGS. 2–4.

Figure 2:
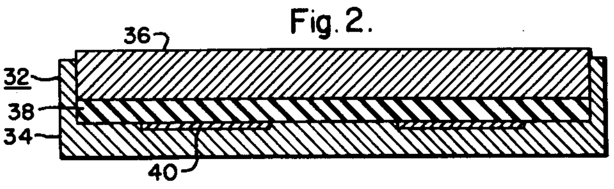
FIG. 2 is a side view in cross section illustrating apparatus for bonding metallic foil to a layer of substantially fully cured organopolysiloxane elastomer.

In FIG. 2 apparatus is illustrated in diagrammatic form which is suitable for preparing such a printed circuit sheet. Reference numeral 32 refers generally to a press having relatively movable die members 34 and 36. As illustrated on the drawing, a layer of organopolysiloxane resin 38 has pieces of metal foil 40 of predetermined shape bonded thereto. The pressed and fully cured printed circuit member is illustrated in side view in FIG. 3 and in top view in FIG. 4. Printed circuit members prepared in accordance with the procedure just described provide a convenient structure upon which electronic components may be mounted conveniently. The utilization of such structures simplifies assembly techniques and eliminates the necessity of individual handling of each lead.

Five transformers prepared in accordance with the procedure described hereinabove were subjected to salt spray and humidity tests to determine their moisture-proof characteristics. The salt spray tests consisted of exposing the transformers for 50 hours to an atomized solution of 20 percent salt in distilled water of a temperature maintained at 95° F. and 100 percent relative humidity. The humidity test consisted of cycling the transformers in a chamber maintained at a relative humidity of 98 to 100 percent while the temperature was raised from 30° to 71° C. during a two hour period. The transformers were held at a temperature of about 71° C. for about six hours, after which they were permitted to cool slowly over a 16 hour period to their original temperature, producing condensation. This cycle was repeated 15 times. The results of these tests are set forth in the following table.

*Table*

| Transformer Number | Winding Number | Insulation Resistance Before Salt Spray (Megohms) | Insulation Resistance After Salt Spray (Megohms) | Insulation Resistance After 15 Cycles of Humidity (Megohms) |
|---|---|---|---|---|
| I | 1 | 95,000 | 115 | 29,000 |
| | 2 | 80,000 | 6.2 | 8,500 |
| | 3 | 190,000 | 7.2 | 3,950 |
| | 4 | 110,000 | 43,000 | 14,000 |
| | 5 | 500,000 | 77,000 | 19,000 |
| II | 1 | 90,000 | 80,000 | 27,000 |
| | 2 | 200,000 | 42,000 | 18,500 |
| | 3 | 1,000,000 | 70,000 | 18,500 |
| | 4 | 90,000 | 48,000 | 15,000 |
| | 5 | 500,000 | 39,000 | 18,500 |
| III | 1 | 60,000 | 70,000 | 22,000 |
| | 2 | 1,000,000 | 65,000 | 5,800 |
| | 3 | 1,000,000 | 8,500 | 6,100 |
| | 4 | 500,000 | 11,300 | 4,350 |
| | 5 | 1,000,000 | 85,000 | 9,300 |
| IV | 1 | 190,000 | 90,000 | 30,000 |
| | 2 | 180,000 | 60,000 | 13,000 |
| | 3 | 1,000,000 | 100,000 | 17,000 |
| | 4 | 1,000,000 | 42,000 | 13,000 |
| | 5 | 500,000 | 51,000 | 42,000 |
| V | 1 | 1,000,000 | 80,000 | 6,000 |
| | 2 | 150,000 | 52,000 | 16,500 |
| | 3 | 500,000 | 90,000 | 35,000 |
| | 4 | 1,000,000 | 58,000 | 8,800 |
| | 5 | 1,000,000 | 39,000 | 5,900 |

By way of comparison a transformer similar to those described hereinabove, except that it was not provided with sealing elements 16 and 24, was submitted to the same salt spray and relative humidity tests. This transformer had a resistance between windings and between windings and ground of less than 1 megohm after only one cycle in the relative humidity test. These test results demonstrate that transformers provided with the sealing elements of this invention such as are illustrated at 16 and 24 on the accompanying drawings insure the provision of a transformer having moisture-proof characteristics far superior to that obtained in the prior art.

While the present invention has been described with reference to what is at present considered to be preferred embodiments thereof, it will be understood of course that certain changes, modifications, substitutions and the like may be made therein without departing from its true scope.

We claim as our invention:

1. A method for preparing a fluid-tight seal about a metallic member carried by an electrical apparatus which comprises mounting a preformed sealing element on said metallic member at a location on said member whereby the ends of the member are left free, said preformed sealing element comprising a layer of metal having a co-extensive layer of fully cured organopolysiloxane elastomer bonded thereto, providing a metal to metal seal between the metal layer of said sealing element and said metallic member to prevent the passage of moisture, applying a quantity of an uncured organopolysiloxane about at least the entire layer of elastomer of the resulting metallic member-sealing element assemblage leaving the ends of the metallic member free, and thereafter applying heat to cure the uncured organopolysiloxane and bond it to the cured organopolysiloxane portion of said sealing element.

2. In the process of insulating an electrical member which process includes encapsulating said member within a layer of insulation, said member having at least one metallic element adapted to extend through said encapsulating layer of insulation, the improvements which comprise (1) positioning a preformed sealing element on said metallic element, at a location between the ends of said element, to prevent the passage of moisture along the metallic element from the outside into the interior of the encapsulated electrical member, said sealing element comprising (*a*) a layer of substantially fully cured organopolysiloxane elastomer and (*b*) metal foil bonded thereto, (2) soldering the metal foil (*b*) of the sealing element to the metallic element, (3) applying an encapsulating coating of an uncured organopolysiloxane about the sealing element and about said electrical member leaving the ends of said metallic member free, and (4) applying heat to cure the uncured organopolysiloxane and bond it to the cured organopolysiloxane (*a*) of the sealing element and provide an encapsulating layer of insultion about the electrical member through which moisture will not pass.

3. A process as set forth in claim 2 wherein the metallic element is an electrically conducting metallic lead.

4. An insulated electrical apparatus comprising an electrical conductor, cured, solid organopolysiloxane insulation disposed about said conductor, and a metallic electrical lead member connected to said conductor and extending outside said insulation, said metallic electrical lead member having a preformed sealing element mounted thereon at a location between its ends, said sealing element comprising a layer of metal having a co-extensive layer of fully cured organopolysiloxane elastomer bonded thereto, the metal layer of said sealing element being soldered to said metallic electrical lead member and the layer of fully cured organopolysiloxane elastomer being bonded to the cured, solid organopolysiloxane insulation which is disposed about said conductor.

References Cited in the file of this patent

UNITED STATES PATENTS

| | | |
|---|---|---|
| 1,850,105 | Higgenbottom | Mar. 22, 1932 |
| 2,202,500 | Lopp | May 28, 1940 |
| 2,391,038 | Riffenberg | Dec. 18, 1945 |
| 2,590,821 | Kiser | Mar. 25, 1952 |
| 2,667,553 | Moorhead et al. | Jan. 26, 1954 |
| 2,724,869 | Merrill et al. | Nov. 29, 1955 |
| 2,792,620 | Kohring | May 21, 1957 |

FOREIGN PATENTS

| | | |
|---|---|---|
| 522,607 | Belgium | Sept. 30, 1953 |